Sept. 8, 1931.  B. HALL  1,822,089
REFRIGERATING APPARATUS
Filed Aug. 5, 1929  2 Sheets-Sheet 2
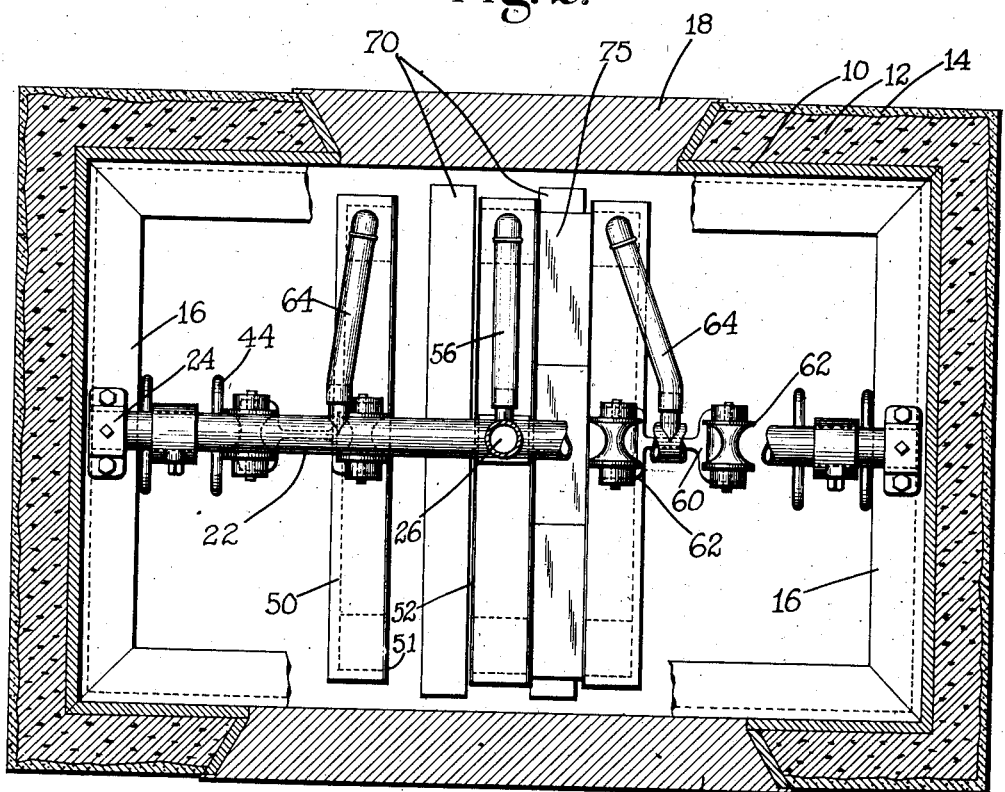
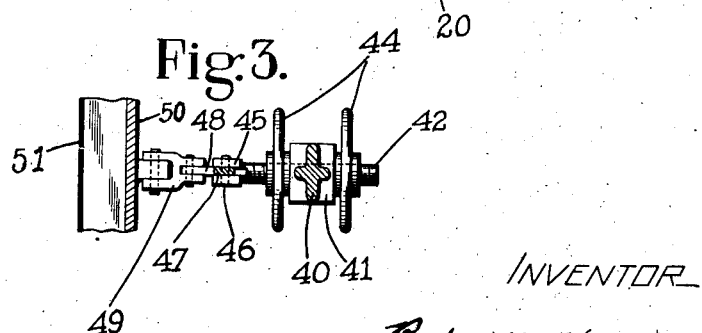

Patented Sept. 8, 1931

1,822,089

UNITED STATES PATENT OFFICE

BICKNELL HALL, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

REFRIGERATING APPARATUS

Application filed August 5, 1929. Serial No. 383,710.

This invention relates to refrigerating apparatus adapted for freezing, quick-freezing, or chilling food products to any desired degree of congelation.

In one aspect my invention consists in refrigerating apparatus in which is employed a heat-conductive member with a vertical effective face against which the products to be frozen are positioned. Apparatus thus characterized has a special advantage in the freezing of liquid or semi-liquid products in containers because whatever air may be enclosed in the container will collect in the upper portion thereof above the product to be frozen, where it is not interposed to act as an insulator between the product and the effective heat-conductive surface.

In another aspect my invention consists in refrigerating apparatus employing as heat-conductive members a series of vertically-arranged plates. My invention contemplates apparatus of this type, so designed as to occupy a relatively small amount of floor space and being, therefore, adapted for installation in plants of medium size, on board vessels, or in any location where limited floor space is available.

An important feature of my invention consists in a stationary heat-conductive plate associated with members on either side thereof which are movable toward the plate to position articles to be refrigerated against its opposite faces. I have thus provided apparatus of general utility in freezing food products of all types, which at the same time has special utility and particular efficiency in freezing liquid or semi-liquid food products.

As herein shown, the heat-conductive plates of the apparatus are supported upon a pipe structure, which may serve not only to support the heat-conductive plates and to guide them in their movement to and from engagement with the product, but may be also utilized as a part of the circulating system for the refrigerating medium. For example, those plates which it is desired to move may be mounted by suitable rolls to travel on the pipes and may have flexible fluid connections to them for receiving and discharging liquid refrigerating medium. A particularly compact and effective assembly is thus secured with ample provision for supplying an adequate amount of refrigerating medium to the heat-conductive plates.

Other features of the invention relate to improved means for moving the heat-conductive plates to and from operative position and for adjustably determining their range of movement to facilitate handling products of different thicknesses. As herein shown, provision is made for a quick approaching or receding movement of the plates through a definite distance so that the product may be quickly engaged prior to the freezing operation and as quickly released after its completion. This is associated with provision for adjusting the point of nearest approach of the plates.

These and other features of the invention will be best understood and appreciated from the following description of a preferred embodiment thereof, selected for purposes of illustration and shown in the accompanying drawings, in which Fig. 1 is a view of the apparatus in vertical section;

Fig. 2 is a view in cross section, on the line 2—2 of Fig. 1; and

Fig. 3 is a fragmentary sectional view, on the line 3—3 of Fig. 1.

Figure 1:
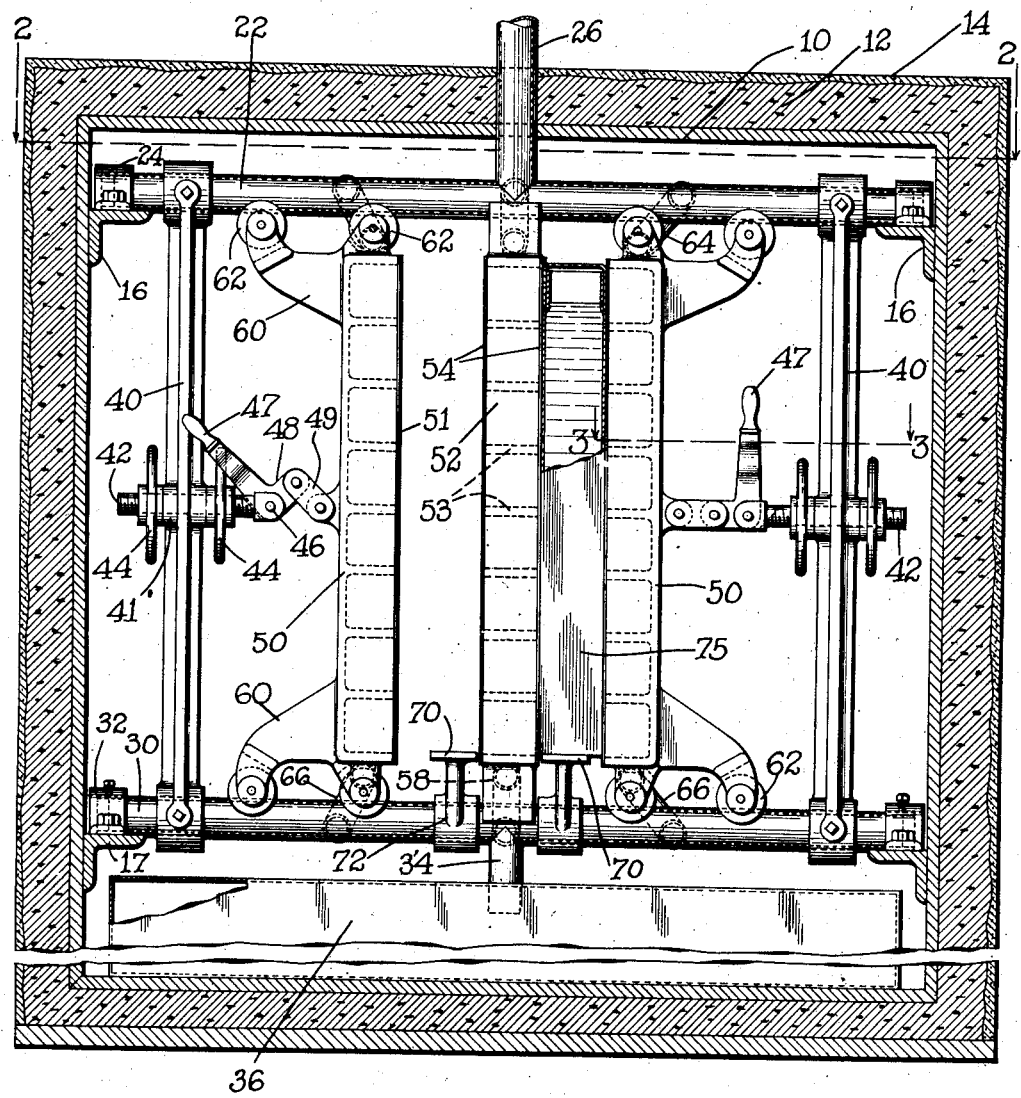

For purposes of illustration, I have shown the apparatus as enclosed in an insulating chamber having walls which comprise an inner casing 10, an outer casing 14, and a filler 12 of ground cork or other insulating material. The chamber is provided at one side with a door 20 and at the opposite side with a door 18 and is otherwise imperforate except for the pipe connections of the cooling system, to be presently described. The character of the insulating enclosure is of secondary importance only, although for economy of refrigeration it is desirable to install and operate the apparatus under conditions which will reduce heat loss to a minimum.

Within the insulating chamber is secured an upper angle iron frame 16 and a lower angle iron frame 17. Extending between the opposite sides of the upper frame 16 is a stationary supply pipe 22, plugged at both ends and held rigidly in place by straps or trunnions 24 bolted to the frame 16. An inlet pipe 26 is led in through the top of the insulated chamber and communicates directly with the supply pipe 22 at a point half way between its ends.

Securely fastened to the opposite sides of the lower frame 17 is a discharge pipe 30, also plugged at both ends and held in place by straps or trunnions 32 bolted to the frame. An outlet pipe 34 communicates with the discharge pipe 30 at a point substantially midway between its ends and leads to a tank or reservoir 36 located within the insulated chamber and beneath the lower frame 17.

The two horizontal pipes 22 and 30 are disposed in parallel relation and connected by a pair of vertical tie bars 40 having hubs which receive the pipes and in which set screws are threaded for clamping the assembly together. Each tie bar 40 has a central hub 41 which is provided with a horizontal bore to receive a threaded shaft 42. Each shaft 42 is adjustably maintained within the bore of the tie bar 40 by a pair of threaded hand wheels 44 which are adapted to lock the shaft 42 in any desired adjusted position. Each shaft 42 at its inner end is provided with a forked head 45 between the arms of which extends a stud 46. A bell crank lever is journaled upon the stud 46, its long arm constituting a hand lever 47 and its short arm a toggle link 48. The toggle link 48 is connected to a second toggle link 49, which is directly connected to a lug upon the hollow plate 50.

In the illustrated embodiment of the apparatus the heat-conductive members comprise a stationary, centrally-disposed plate 52 and a pair of movable plates 50, one disposed on either side of the stationary plate. The centrally disposed plate 52 is formed with a cored or box center portion having internal ribs or baffle plates 53 so disposed as to form a sinuous passage for the refrigerating medium. The opposite faces of the plate 52 are formed of thin sheet metal 54 brazed or otherwise secured to the box so as to form a moisture-tight connection and being extremely responsive in the conduction of heat from the article to be refrigerated to the refrigerating medium circulating within it. In the upper and lower edges of the plate 52 are formed grooves or saddles fitting the pipes 22 and 30, it being understood that this plate is rigidly secured in place between them. A flexible tubular connection 56 extends rearwardly from the supply pipe 22 to the rear upper corner of the plate 52 and a similar connection 58 extends between the rear lower corner of the plate and the discharge pipe 30.

Each of the plates 50 comprises a cored body portion and a sheet metal facing 51. The body portion of these plates is provided with a bracket 60 at its upper and lower edges, in which are journaled concave rollers 62 running upon the pipes 22 and 30 and spaced from each other so as to maintain the plates 50 always in vertical position. A flexible connection 64 extends between the supply pipe 22 and the rear upper corner of each plate 50. A corresponding flexible connection 66 extends between the discharge pipe 30 and the rear lower corner of each plate, the flexible connections permitting a limited horizontal movement of the plates 50 toward and from the stationary centrally-disposed plate 52, while maintaining at all times connections for the free circulation of refrigerating medium.

An elongated transverse support 70 is mounted upon the discharge pipe 30 by means of a hub 72 adjacent to the lower edge of the stationary plate 52 and on each side thereof. The supports 70 extend substantially across the insulated chamber and serve to position articles to be refrigerated adjacent to the faces of the plate and also as a guideway along which articles or containers may be advanced in being presented to or removed from the apparatus.

It will be apparent that by straightening the toggle links 48—49 either of the plates 50 or both of them may be moved toward the stationary plate 52 to a predetermined point, as, for example, to position or press against the face of the plate 52 an article of given thickness which it is desired to quick-freeze. Similarly, when the toggle links 48—49 are broken, the plate 50 or both of them are moved away from the stationary plate to a predetermined distance, thus releasing the article to be refrigerated. The amplitude of this movement and the points of nearest approach and furthest separation with reference to the stationary plate may be adjusted by moving the threaded shaft 42 lengthwise in its bore by means of the hand wheels 44, and in this way any desired degree of pressure upon the article to be refrigerated may be secured.

For purposes of illustration, I have shown a flat container 75 for a liquid food product in position to be quick-frozen between the stationary plate 52 and the right-hand movable plate 50, the container resting upon the right-hand support 70 and corresponding in height substantially to the height of the heat-conductive plates. In using the illustrated apparatus, the container 75 or the article to be frozen is introduced through the door 20 upon one of the supports 70 and the lever 47 is thrown to straighten the toggle links after appropriate adjustment of the shaft 42. A liquid refrigerating medium, such, for example, as calcium chloride brine, at a temperature approximating −45° F., as delivered through the inlet pipe 26 to the supply pipe 22, whence it passes through the flexible connections 56 and 64 to the upper portion of the heat-conductive plates 50 and 52. The brine passes downwardly through the passages of these plates, taking up heat by conduction from the article clamped between them and reaches the discharge pipe 30. From the discharge pipe 30 it passes through the outlet pipe 34 to the reservoir 36 and from this it is re-circulated to the inlet pipe 26, en route passing through a suitable refrigerating machine by which its temperature is reduced again to the proper degree. After a suitable interval, the lever 47 is rocked to break the toggle links and release the frozen article, which may be then pushed along the support 70 and out of the insulated chamber through the door 18.

Having thus described my invention, what I claim as new and desire to secure by Letters Patent is:

1. A refrigerating apparatus comprising a stationary heat-conductive plate, and members disposed on either side of the stationary plate and movable toward the latter to position articles to be refrigerated against its opposite faces.

2. A refrigerating apparatus comprising a stationary heat-conductive plate, positioning members disposed on either side of the stationary plate, and means for independently moving either of said members toward the stationary plate to position an article to be refrigerated against either of its faces.

3. A refrigerating apparatus comprising a stationary vertically disposed heat-conductive plate, a support located adjacent to the lower edge of the plate, and means for pressing into intimate contact with the face of the plate an article to be refrigerated which rests upon the support.

4. A refrigerating apparatus comprising a stationary vertically disposed heat-conductive plate, supports located adjacent to the lower edge of the plate, and means for pressing into contact with the opposite faces of the plate articles resting on said supports.

5. A refrigerating apparatus comprising a stationary double-faced heat-conductive plate, a positioning member mounted at either side thereof, means for moving either of said members a predetermined distance toward or away from one of the faces of said stationary plate, and means for independently adjusting the point of nearest approach of said member and plate.

6. A refrigerating apparatus comprising a stationary double-faced heat-conductive plate, an article positioning member mounted at either side thereof, means for moving either member toward one side of the plate in a step of fixed length, and means for adjustably determining the position of the member so moved.

7. A refrigerating apparatus comprising a heat-conductive member having oppositely directed vertical faces, positioning members arranged to hold articles to be refrigerated firmly in engagement with both of said faces, and means for independently moving either member to release the article positioned by it.

8. A refrigerating apparatus comprising a heat-conductive member having oppositely directed vertical refrigerating faces, means for supplying refrigerating medium to said member, and movable heat-conductive plates arranged to cooperate with said member in confining articles to be refrigerated against either face thereof.

9. A refrigerating apparatus comprising a centrally-disposed, heat-conductive plate having vertical faces, supports located adjacent to the lower edge of the plate, and movable heat-conductive plates arranged for pressing into contact with the opposite faces of the plate articles resting on said supports.

10. A refrigerating apparatus comprising a plurality of heat-conductive plates, pipes for movably supporting said plates, and flexible connections between said pipes and plates for supplying a refrigerating medium to the plates.

11. A refrigerating apparatus comprising a support, cooperating heat-conductive plates, of which one is provided with spaced rolls maintaining it in vertical position upon the support and at the same time permitting bodily movement thereof toward and from the other plate.

12. A refrigerating apparatus comprising relatively movable hollow heat-conductive plates, stationary pipes supporting said plates in parallel relation by their opposite edges, and tubular connections between said pipes and plates.

13. In a refrigerating apparatus a frame comprising parallel pipes and spacing tie rods, a series of hollow heat-conductive plates maintained in parallel relation within the frame and having fluid supply connections with said pipes and adjusting means for the plates included within the frame.

14. In a refrigerating apparatus a frame comprising parallel pipes and spacing tie rods forming a rigid self-contained structure, a series of hollow heat-conductive plates supported in vertical position within said frame and having fluid supply connections with said pipes, and means contained within said frame for relatively moving said plates to engage and disengage articles to be refrigerated.

15. In a refrigerating apparatus a frame comprising pipes and tie rods forming a self-contained structure, a stationary hollow heat-conductive plate mounted in the frame and connected to the pipes, a presser plate mounted in the frame for movement toward and from the stationary plate, a support adjustable in the frame, and toggle mechanism interposed between said support and the movable plate.

16. In a refrigerating apparatus a frame comprising pipes and tie rods forming a self-contained structure, hollow heat-conductive plates mounted in vertical position within said frame and having connection with the pipes, and an elongated support also mounted in the frame and disposed adjacent to the lower edges of the plates.

17. A refrigerating apparatus comprising an insulated chamber, a frame comprising pipes and tie rods forming a self-contained structure within the chamber, hollow heat-conductive plates supported in vertical position within said frame and having connection with the pipes, and a tank for refrigerating medium located within the chamber and connected with said pipes.

18. A refrigerating apparatus comprising an insulated chamber, a series of relatively movable hollow heat-conductive plates mounted in the chamber, connections for circulating a liquid refrigerating medium through said plates, a reservoir for said medium also located within said chamber, and pipe connections for collecting the refrigerating medium from said hollow plates and discharging it into the reservoir.

19. A refrigerating apparatus comprising a heat-conductive plate, a positioning member located adjacent to one face thereof, means for moving the positioning member a predetermined distance toward or away from said face, and means for independently adjusting the point of nearest approach of said member to said face.

20. A refrigerating apparatus comprising a refrigerated member having a vertical heat-conductive wall, a shelf located adjacent to the foot of said wall for supporting a product to be frozen in a position contiguous thereto, and a presser member movable to engage the product so supported and press it firmly into surface contact with said heat-conductive wall.

BICKNELL HALL.